United States Patent
Motoyama

(10) Patent No.: US 6,221,281 B1
(45) Date of Patent: Apr. 24, 2001

(54) LIQUID IMMERSION OIL

(75) Inventor: Izumi Motoyama, Hachioji (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 09/289,976

(22) Filed: Apr. 13, 1999

(30) Foreign Application Priority Data

Nov. 5, 1998 (JP) .................................................. 10-315141

(51) Int. Cl.$^7$ ....................................................... G02B 5/24
(52) U.S. Cl. ........................ 252/408.1; 252/582; 252/589; 359/358; 359/886
(58) Field of Search ................................ 252/408.1, 582, 252/589; 359/358, 886; 585/1

(56) References Cited

U.S. PATENT DOCUMENTS

| | | |
|---|---|---|
| 3,437,402 * | 4/1969 | Levins . |
| 3,929,667 | 12/1975 | Bautis . |
| 3,979,301 | 9/1976 | Ushioda et al. . |
| 4,108,794 | 8/1978 | Yonekubo . |
| 4,465,621 * | 8/1984 | Sacher . |
| 4,491,533 * | 1/1985 | Sacher et al. . |
| 4,493,533 * | 1/1985 | Petrzilka et al. . |
| 4,559,147 * | 12/1985 | Hirth et al. . |
| 4,587,042 * | 5/1986 | Liva . |
| 4,789,490 * | 12/1988 | Tanaka . |
| 4,832,855 * | 5/1989 | Tanaka . |
| 5,817,256 * | 10/1998 | Weippert . |

FOREIGN PATENT DOCUMENTS

| | | |
|---|---|---|
| 02-9621A2 * | 1/1987 | (EP) . |
| 2-55-35053 | 9/1980 | (JP) . |
| 2-4-013687 | 3/1992 | (JP) . |

* cited by examiner

Primary Examiner—Deborah Jones
Assistant Examiner—Jennifer McNeil
(74) Attorney, Agent, or Firm—Oliff & Berridge, PLC

(57) ABSTRACT

A liquid immersion oil which is used in optical systems in any of the fields of microscopes, fluorescence microscopes, optical measurements and other related fields includes a liquid polyolefine or a liquid copolymer of butylene (α-butylene, β-butylene) and another olefine, blended with an aromatic compound, or blended with an aromatic compound and a paraffin compound.

5 Claims, No Drawings

LIQUID IMMERSION OIL

The disclosures of the following priority applications are herein incorporated by reference:

Japanese Patent Application No. 10-011031 filed Jan. 23, 1998

Japanese Patent Application No. 10-315141 filed Nov. 05, 1998

BACKGROUND OF THE INVENTION

1. Field of the Invention

The present invention relates to a liquid immersion oil having desirable characteristics with respect to transparency, viscosity, durability and the like. More particularly, it relates to a liquid immersion oil having low fluorescence which is suitable for use as a liquid immersion oil in fluorescence microscopes and ability which can regulate a refractive index throughout a wide range and is suitable for use as an optical liquid immersion oil in the field of optical measurements or other related fields.

2. Description of the Related Art

Liquid immersion oils are extremely widely used in the optical systems of microscopes, optical measurements and other related fields.

The reason that liquid immersion oils are often used in such fields is that, in comparison with an optical system not using such an oil, the use of a liquid immersion oil not only substantially reduces surface aberrations but also allows for increases in the magnification of the optical system by increasing the numerical aperture of the objective lens.

Such liquid immersion oils as Cedar oil or Cargill oil are well known in the prior art.

Cedar oil is oil obtained from oil of cedar wood being dissolved in toluene. However for example, when used during observations using microscopes, toluene gradually vaporizes with the passage of time. Therefore the oil not only loses its optical capabilities as a liquid immersion oil but also hardens as a result of polymerization due to oxidation reactions between oil of cedar wood and air.

Cargill oil entails the problem of toxicity to the human body since it contains large amounts of polychlorinated biphenyl (PCB).

Thus in recent years, the following oils which do not have the above drawbacks have been used as liquid immersion oils for microscopes: a liquid immersion oil based on benzylbutyl phthalate and chlorinated paraffin as disclosed in U.S. Pat. No. 4,465,621, a liquid immersion oil based on a liquid dien-polymer and liquid paraffin as disclosed in Japanese Patent Publication No. 4-13687, a liquid immersion oil based on a liquid hydrocarbon copolymer with, a diphenylmethane derivative or a bis-($\alpha$-alkylbenzyl)-alkylbenzene derivative or 2,4-diphenyl-4-dimethylphenylbutane as disclosed in Japanese Patent Publication No. 55-35053.

Furthermore in the optical systems of optical measurements and other related areas, 1-pentanol-1, 2-dibromopropane, methylsalicylate, nitrobenzene and the like have been used as immersion oils. A substance which has a refractive index required for use is optionally selected among these substances and is used.

However, the above oils have the low viscosity and can not be held as liquid immersion oils, and thus lack of liquid occurs when using. Furthermore a desirable refractive index is sometimes not achieved.

Thus mixtures of two or more compatible substances which have refractive indexes different from each other, such as mixtures of petroleum and turpentine oil, turpentine oil and 1, 2-dibromoethylene, 1-bromoethylene and clove oil, achieves a liquid immersion oil which has a refractive index required when using. And these mixtures are used as immersion oils.

Such liquid immersion oils such as those based on benzylbutyl phthalate and chlorinated paraffin, or based on a liquid diene-polymer and liquid paraffin, or based on liquid hydrocarbon copolymer with, a diphenylmethane derivative or a bis-($\alpha$-alkylbenzyl)-alkylbenzene derivative or 2,4-diphenyl-4-dimethylphenylbutane sufficiently satisfy several requirements for use as a liquid immersion oil such as refractive index, Abbe's number, resolution and the like. On the other hand however, such oils give off large amounts of fluorescence when excited by ultraviolet radiation (rays). As a result, observational accuracy is reduced when they are used as an liquid immersion oil for fluorescence microscopes.

Fluorescence microscopes are used in the fields of medical treatment field and biology to observe specimens by irradiating excited light such as ultraviolet radiation onto a specimen and observe the fluorescence given off by the observation object (cell, tissue of an organism or bacteria)

Particularly in recent years, much research has been made into fluorescence microscopes which detect the weak fluorescence given off by extremely small amounts of bacteria or cells. However large amounts of fluorescence may be given off when ultraviolet radiation excites a liquid immersion oil used in the optical system of fluorescence microscopes while detecting such weak fluorescence as above. Such fluorescence acts as noise during observation (detection) and thus reduces the accuracy of the observation (detection).

Furthermore liquid immersion oils created from the mixture of compatible two or more substances which have different refractive indexes from each other, such as mixtures of petroleum and turpentine oil, turpentine oil and 1, 2-dibromoethylene, and 1-bromoethylene and clove oil, entails the problem that turpentine oil and clove oil harden and undergo coloration due to oxidization. Furthermore the problem has arisen that many combinations contain substances which adversely affect the human body or the environment in general or which have low flash points.

SUMMARY OF THE INVENTION

The present invention is proposed to solve the above problems and has as its object the provision of a liquid immersion oil which generates extremely low amounts of fluorescence due to excitation by ultraviolet rays and which can be adjusted to an arbitrary refractive index. More particularly the liquid immersion oil displays extremely high durability to heat and light. It has extremely few adverse effects which are harmful (toxic) to the environment or to human beings. Furthermore it has improved optical characteristics (withrespecttosuchfactorsas transparency, refractive index, dispersion, and the like), viscosity, durability, resistance to drying, and the like.

In order to achieve the above object, the first liquid immersion oil according to the present invention comprises a liquid polyolefine blended with an aromatic compound.

The second liquid immersion oil according to the present invention comprises a liquid polyolefine blended with an aromatic compound and a paraffin compound.

The third liquid immersion oil according to the present invention comprises a liquid copolymer of butylene ($\alpha$-butylene, $\beta$-butylene) and another olefine, blended with an aromatic compound.

The fourth liquid immersion oil according to the present invention comprises a liquid copolymer of butylene (α-butylene, β-butylene) and another olefine, blended with an aromatic compound and a paraffin compound.

In the first liquid immersion oil, it is preferred that a liquid polyolefine is liquid polybutene (polybutylene).

In the second liquid immersion oil, it is preferred that a liquid polyolefine is liquid polybutene (polybutylene).

In the third liquid immersion oil, it is preferred that an olefine is a compound expressed by the formula $C_mH_{2m}$ (m=2–6).

In the fourth liquid immersion oil, it is preferred that an olefine is a compound expressed by the formula $C_mH_{2m}$ (m=2–6).

In the first liquid immersion oil, it is preferred that an aromatic compound has an ether linkage.

In the second liquid immersion oil, it is preferred that an aromatic compound has an ether linkage.

In the third liquid immersion oil, it is preferred that an aromatic compound has an ether linkage.

In the fourth liquid immersion oil, it is preferred that an aromatic compound has an ether linkage.

In the first liquid immersion oil, it is preferred that the mixture comprises 30–90 parts per volume of liquid polyolefine, 70–10 parts per volume of aromatic compound, and 0–60 parts per volume of paraffin compound.

In the second liquid immersion oil, it is preferred that the mixture comprises 30–90 parts per volume of liquid polyolefine, 70–10 parts per volume of aromatic compound, and 0–60 parts per volume of paraffin compound.

In the third liquid immersion oil, it is preferred that the mixture comprises 30–90 parts per volume of liquid copolymer, 70–10 parts per volume of aromatic compound, and 0–60 parts per volume of paraffin compound.

In the fourth liquid immersion oil, it is preferred that the mixture comprises 30–90 parts per volume of liquid copolymer, 70–10 parts per volume of aromatic compound, and 0–60 parts per volume of paraffin compound.

In the first liquid immersion oil, it is preferred that the number-average molecular weight of the liquid polyolefine is 300–2000.

In the second liquid immersion oil, it is preferred that the number-average molecular weight of the liquid polyolefine is 300–2000.

In the third liquid immersion oil, it is preferred that the number-average molecular weight of the liquid copolymer is 300–2000.

In the fourth liquid immersion oil, it is preferred that the number-average molecular weight of the liquid copolymer is 300–2000.

In the first liquid immersion oil, it is preferred that the number-average molecular weight of the liquid polyolefine is 500–2000.

In the second liquid immersion oil, it is preferred that the number-average molecular weight of the liquid polyolefine is 500–2000.

In the third liquid immersion oil, it is preferred that the number-average molecular weight of the liquid copolymer is 500–2000.

In the fourth liquid immersion oil, it is preferred that the number-average molecular weight of the liquid copolymer is 500–2000.

In the first liquid immersion oil, it is preferred that the liquid immersion oil is used in optical systems in any of the fields of microscopes, fluorescence microscopes, optical measurement and related fields.

In the second liquid immersion oil, it is preferred that the liquid immersion oil is used in optical systems in any of the fields of microscopes, fluorescence microscopes, optical measurement and related fields.

In the third liquid immersion oil, it is preferred that the liquid immersion oil is used in optical systems in any of the fields of microscopes, fluorescence microscopes, optical measurement and related fields.

In the fourth liquid immersion oil, it is preferred that the liquid immersion oil is used in optical systems in any of the fields of microscopes, fluorescence microscopes, optical measurement and related fields.

DESCRIPTION OF THE PREFERRED EMBODIMENT(S)

The liquid immersion oil of the present invention is comprised of a mixture of one or more aromatic compounds with a liquid copolymer of liquid polyolefine or butylene (α-butylene, β-butylene) and other olefines or a mixture of an aromatic compound with a paraffin compound. As a result, the liquid immersion oil of the present invention generates extremely low amounts of fluorescence in response to excitation by ultraviolet rays.

That is to say, since the liquid immersion oil of the present invention generates extremely small amounts of fluorescence in response to excitation by ultraviolet rays, no reduction in the accuracy of observations (detection) results due to noise during observation (detection) This is the case even when using as a liquid immersion oil for fluorescence microscopes which detect weak fluorescence given off by extremely small amounts of bacteria and cells.

Furthermore the liquid immersion oil of the present invention has few adverse effects on the human body or the environment.

It is preferred that liquidpolybutene (polybutylene) for example is used as the liquid polyolefine of the present invention.

It is preferred that propylene, isobutylene, 1-pentene, or 2-pentene for example is used as the olefine of the present invention.

It is preferred that the aromatic compound comprises, in a single molecule, an alicyclic radical or hydroxyl having high compatibility with the liquid polyolefine or the above liquid copolymer, an alkyl group, and a phenyl group which enables a high refractive index. This is because the blending of such given compound, such as a refractive index regulator, a surface-active agent, or the like is not required.

That is to say, the liquid immersion oil itself has a simple structure and the refractive index thereof is extremely easily regulated when blending the liquid immersion oil.

It is preferred that a substance having an ether linkage is used as the aromatic compound of the present invention.

The following compounds have two or more aromatic groups for example: diphenyl ether, dibenzyl ether, benzylphenyl ether, phenoxytoluene, phenoxybenzoic acid. The following compounds have a single aromatic group for example: methylphenyl ether, ethylphenyl ether, and butylphenyl ether. The above are given as examples of the aromatic compound used in the present invention.

It is possible to use the above compounds singly. However, it is also possible to use combinations of two or more at arbitrary ratios.

Furthermore the following compounds are given as examples of the paraffin compound used in the present invention: an alicyclic radical such as dicyclohexyl, ethylcyclohexane, a alkyl group such as n-octane, n-nonane, n-decane, or a substance having a side chain such as dimethyl hexane, or isooctane.

Addition to the above, paraffin compounds used in the present invention may be also selected from compounds having terminal hydrogen groups such as octanol or decanol if such substances have extremely few adverse influences on the human body or the environment and display extremely high durability with respect to heat and light.

It is possible to use the above compounds singly. However, it is also possible to use combinations of two or more at arbitrary ratios.

Furthermore the aromatic group and paraffin compound of the present invention is not limited to the above examples and it is possible to selectively blend other structural elements in an arbitrary manner. In particular, in order to obtain a liquid immersion oil with a high refractive index (for example above nd=1.517), it is preferable to select the above aromatic compounds and paraffin compounds with a high refractive index.

The liquid immersion oil of the present invention generates extremely small amounts of fluorescence due to excitation by ultraviolet rays by adjusting or regulating of the blending ratios of each component. In particular it has little adverse effect on the human body and the environment, displays extremely high durability to heat and light and comprises improved characteristics with respect to durability, resistance to drying, viscosity and optical characteristics (transparency, refractive index, dispersion, or the like).

For example it is preferable that a liquid immersion oil for use with microscopes is formed by 30–90 parts per volume of a liquid polyolefine or the above liquid copolymer, 70–10 parts per volume of the above aromatic compound, and 0–60 parts per volume of the above paraffin compounds. Such a liquid immersion oil generates extremely small amounts of fluorescence due to excitation by ultraviolet rays. In particular it has few adverse influences on the human body and the environment, displays extremely high durability to heat and light and comprises improved characteristics with respect to factors such as durability, resistance to drying, viscosity and optical characteristics (transparency, refractive index, dispersion, or the like).

It is preferable that the number-average molecular weight of the liquid polyolefine or liquid copolymer used in the present invention is 300–2000.

It is preferable that the number-average molecular weight of the liquid polyolefine or liquid copolymer used in the present invention is equal to or above 300 because the viscosity of the liquid immersion oil so formed is not too low (which means viscous).

Furthermore it is preferable that the number-average molecular weight of the liquid polyolefine or liquid copolymer used in the present invention is below 2000, because it is easy to regulate the composition of the liquid immersion oil in order to obtain desired characteristics and obtain a desired viscosity in the liquid immersion oil obtained by such regulation.

That is to say, problems such that blending is extremely difficult due to a high number-average molecular weight of the liquid polyolefine or liquid copolymer and the liquid immersion oil obtained after regulation hardens or forms wax can be avoided.

It is further preferable that the number-average molecular weight of the liquid polyolefine or liquid copolymer used in the present invention is 500–2000 so as to obtain a liquid immersion oil with a particularly desirable viscosity.

With respect to the optical characteristics of the liquid immersion oil of the present invention, the Abbe's number determines whether or not the degree of dispersion of light is good. It is preferred that the value of the Abbe's number (vd) is in the range between 30–65. In particular, the Abbe's number of a liquid immersion oil for use with fluorescence microscopes is most preferably in the range vd=43±3 as set by the JIS.

Of the above optical characteristics, a substance is generally used which gives the liquid immersion oil a refractive index of nd=1.3–1.6. In particular the refractive index of a liquid immersion oil for use with fluorescence microscopes should be equal to or approximate to the refractive index of the objective lens of the fluorescence microscope.

The objective lens of the microscope with a refractive index of nd=1.5–1.6 is generally used. The objective lens with the refractive index of nd=1.515 is most commonly used. Thus the refractive index of a liquid immersion oil foruse with microscopes as set by JIS should be in the target range of nd=1.515±0.001.

The Abbe's number of the liquid immersion oil may be regulated by variation of the constituent amount of liquid copolymer or liquid polyolefine. The refractive index of the liquid immersion oil may be regulated by variation of the kinds of the above aromatic compounds and paraffin compounds or by variation of the blending ratios of the above aromatic compounds or paraffin compounds.

The liquid immersion oil of the present invention displays easy regulation of optical characteristics such as Abbe's number or refractive index in addition to the fact that, in comparison with conventional liquid immersion oils, no or extremely few adverse effects are given to the human body or the environment and almost no deterioration over time is seen even during long term placement in high temperature or light irradiation environments. Furthermore as the present liquid immersion oil displays extremely little spontaneous fluorescence, it is adapted for use not only as an extremely suitable immersion oil for the optical systems of general microscopes, optical measurements and other related fields, but also as an immersion oil for fluorescence microscopes for example.

Below, examples of the invention will be explained in further detail. However, it is understood that the present invention is not limited to the disclosed examples.

EXAMPLE 1

After polybutene 62 vol % with a number-average molecular weight of 1000 is mixed in a beaker with diphenyl ether 27 vol % and liquid parraffin 11 vol %, heated for 30 minutes at 40° C. at atmospheric pressure and then cooled to room temperature, an immersion oil for use with fluorescence microscopes is obtained which has nd=1.515, vd=42.

EXAMPLE 2

After polybutene 22 vol % with a number-average molecular weight of 1000 is mixed in a beaker with diphenyl ether 62 vol % and decanol 16 vol %, heated for 30minutes at 40° C. atmospheric pressure and then cooled to room temperature, an immersion oil for use with fluorescence microscopes is obtained which has nd=1.540, vd=32.

EXAMPLE 3

After polybutene 20 vol % with a number-average molecular weight of 1000 is mixed in beaker with diphenyl ether 8 vol % and decanol 72 vol %, heated for 30 minutes at 40° C. at atmospheric pressure and then cooled to room temperature, an immersion oil is obtained which has nd=1.460, vd=51.

COMPARATIVE EXAMPLE 1, 2

Two types of low fluorescent oil sold on the market as liquid immersionoil forfluorescencemicroscopeswere selected as comparative examples for the above examples.

Respective evaluations for liquid immersion oils of the above each example and each comparative example are stated below. The evaluations are presented in Table 1.

Optical characteristics such as refractive index ($nd_{23}$) and Abbe's number($vd_{23}$) were measured based on JIS standard K2101.

Dynamic viscosity was measured at 25° C. based on JIS standard K2283 and substances in the range 120–600 cSt are marked with "good(◯)".

Resistance to drying was experimentally measured by disposal in an environment at 30° C. for 24 hours according to the procedure of item 13 (evaporation experiments) as stated in JIS standard C2101 for electrically insulating oils. Those substances with an evaporated amount of less than 1 wt % are marked with "good(◯)".

Outer appearance was confirmed by the presence or absence of turbidity in the liquid immersion oil itself and those substances without turbidity are marked with "good (◯)".

Weather resistance is measured on the basis of light irradiation experiments and heat deterioration experiments as discussed below. Oils without variation in hue, Abbe's number, refractive index after the above experiments are marked with "good(◯)".

The light irradiation experiments comprised placing 40 g of sample in a 9 cm-diameter Petri dish (Schale) and exposing the sample to a 20W white light bulb. The distance between the sample and the bulb was maintained at 15 cm and exposure was conducted for 120 hours. Thereafter variation in refractive index, Abbe's number and hue was tested. In the event of no variation in either being observed, the sample result was marked with "good(◯)".

Experiments with respect to thermal deterioration comprised placing a 40 g sample in a 50 ml Erlenmeyer flask with a stopper. After holding the sample for 24 hours in a high temperature thermostat which is regulated to a temperature of 70° C., variation in refractive index, Abbe's number and hue was tested. In the event of no variation in any of the above being observed, the sample result was marked with "good(◯)".

Chromatic aberration was defined as acceptable within the range of Abbe's number values of vd=30–65.

Transparency was defined as acceptable and was marked with "good(◯)" for those in which transmissivity was above 95% on the basis of JIS standard K0115.

Under the normal use conditions of a fluorescence microscope, ultraviolet rays are generated to excite fluorescence through use of an ultra-high pressure mercury vapor lamp as a source of light. Excitation light used in such a case falls into the categories of 340 nm excitation, 365 nm excitation, 410nm excitation, 510 nm excitation, 546 nm excitation. In each category of excitation light, it is desirable that the amount of fluorescence generated is low.

The fluorescence intensity (relative intensity) due to each excitation light in examples 1–3 and comparative examples 1, 2 are shown in Table 2.

As shown in Tables 1 and 2, the liquid immersion oil of the present embodiment has superior characteristics with respect to the generation of fluorescence in comparison with liquid immersion oil sold on the market for microscopes or liquid immersion oil sold on the market for optical system in optical measurement fields or related fields.

In other words, the liquid immersion oil of the present embodiment displays extremely low generation of fluorescence in each above excitation category due to ultraviolet rays even whenusedas a liquidimmersionoil for fluorescence microscopes which detect the extremely small quantities of fluorescence emitted by bacteria, cells or the like. Thus no problem arises with respect to reduced accuracy of observation (detection) due to noise when observing (detection).

Furthermore the liquid immersion oil of the present embodiment displays extremely low generation of fluorescence due to ultraviolet excitation and extremely high resistance in particular to heat and light. Adverse effects on the environment and the human body are extremely low and the oil displays improved characteristics with respect to items such as durability, resistance to drying, viscosity, and optical characteristics (transparency, refractive index, dispersion or the like).

TABLE 1

|  | Example 1 | Example 2 | Example 3 | Comparative example 1 | Comparative example 2 |
|---|---|---|---|---|---|
| Refractive index (nd) | 1.515 | 1.540 | 1.460 | 1.515 | 1.515 |
| Abbe's number (vd) | 42 | 32 | 51 | 41 | 44 |
| Amount of fluorescence | ◯ | ◯ | ◯ | X | X |
| Dynamic viscosity | ◯ | ◯ | ◯ | ◯ | ◯ |
| Resistance to drying | ◯ | ◯ | ◯ | ◯ | ◯ |
| Outer appearance | ◯ | ◯ | ◯ | ◯ | ◯ |
| Weather resistance | ◯ | ◯ | ◯ | X | ◯ |
| Chromatic aberration | ◯ | ◯ | ◯ | ◯ | ◯ |
| Transparency | ◯ | ◯ | ◯ | ◯ | ◯ |

TABLE 2

|  | Example 1 | Example 2 | Example 3 | Comparative example 1 | Comparative example 2 |
|---|---|---|---|---|---|
| 340 nm excitation | 18 | 18 | 19 | >100 | 29 |
| 365 nm excitation | 4 | 3 | 4 | 43 | 20 |
| 410 nm excitation | 1.9 | 2.1 | 2.1 | 6.1 | 5.3 |
| 510 nm excitation | 0.4 | 0.4 | 0.4 | 0.8 | 0.7 |
| 546 nm excitation | 0.1 | 0.2 | 0.1 | 0.5 | 0.5 |

As explained above, the liquid immersion oil of the present invention displays extremely low generation of fluorescence due to ultraviolet excitation and extremely high resistance in particular to heat and light. Adverse effects on the environment and the human body are extremely low and the oil displays improved characteristics with respect to items such as durability, resistance to drying, viscosity, and optical characteristics (transparency, refractive index, dispersion or the like).

In other words, the liquid immersion oil itself displays extremely low generation of fluorescence. In addition other characteristics such as refractive index, Abbe's number, viscosity and resolving power are improved and for example the oil has superior characteristics as a liquid immersion oil for fluorescence microscopes.

What is claimed is:

1. A liquid immersion oil that is used for a microscope comprising:
   a liquid polybutene blended with at least one diphenyl ether and, optionally, a paraffin compound, wherein:
   a constituent amount of said liquid polybutene is varied so that an Abbe's number vd of the liquid immersion oil achieves a value between 30–65; and
   a blending ratio of said liquid polybutene with said at least one diphenyl ether and said optional paraffin compound is varied so that a refractive index nd of the liquid immersion oil achieves a value between 1.3–1.6.

2. A liquid immersion oil according to claim 1, wherein said liquid immersion oil comprises 30–90 part per volume of said liquid polybutene, 70–10 parts per volume of said diphenyl ether, and 0–60 parts per volume of said paraffin compound.

3. A liquid immersion oil that is used for a microscope, comprising:
   a liquid polybutene blended with an aromatic compound having an ether linkage, wherein:
   a constituent amount of said polybutene is varied so that Abbe's number vd of the liquid immersion oil achieves a value between 30–65; and
   wherein said aromatic compound is varied so that a refractive index nd of the liquid immersion oil achieves a value between 1.3–1.6.

4. A liquid immersion oil according to claim 3, wherein said aromatic compound is a diphenyl ether.

5. A liquid immersion oil according to claim 3, wherein when the liquid immersion oil is used for a fluorescence microscope, the Abbe's number vd of the liquid immersion oil achieves a value of 43±3 and the refractive index nd of the liquid immersion oil achieves a value identical or approximate to the refractive index of an object lens of the fluorescence microscope.

* * * * *